United States Patent
Johannsen et al.

[15] 3,656,556
[45] Apr. 18, 1972

[54] REVERSIBLE DISK PLOW

[72] Inventors: Bruno Bernhardt Johannsen, Moline; Robert Earl Cox, Rock Island, both of Ill.

[73] Assignee: Deere & Company, Moline, Ill.

[22] Filed: Oct. 20, 1969

[21] Appl. No.: 867,821

[52] U.S. Cl............................172/212, 172/413, 172/414, 172/417
[51] Int. Cl. .......................................................A01b 3/40
[58] Field of Search..................172/161, 204, 205, 210, 211, 172/219, 212, 220, 224, 225, 407, 409, 278, 282, 285, 316, 318, 406, 413, 414, 442, 577, 578

[56] References Cited

UNITED STATES PATENTS

| | | | |
|---|---|---|---|
| 2,724,313 | 11/1955 | Jennings | 172/212 |
| 2,732,781 | 1/1956 | Coviello | 172/212 |
| 2,764,075 | 9/1956 | Fowler | 172/211 |
| 2,949,161 | 8/1960 | Campbell | 172/212 |
| 3,045,765 | 7/1962 | Cox et al | 172/212 |
| 3,186,496 | 6/1965 | Cox et al | 172/211 |
| 3,390,726 | 7/1968 | Johannsen | 172/212 |
| 3,503,453 | 3/1970 | Johannsen et al. | 172/212 |
| 3,481,406 | 12/1969 | Watts | 172/204 |

*Primary Examiner*—Robert E. Pulfrey
*Assistant Examiner*—R. T. Rader
*Attorney*—H. Vincent Harsha, Harold M. Knoth, William A. Murray and John M. Nolan

[57] ABSTRACT

A reversible disk plow having a main frame and a tool-carrying subframe mounted intermediate its ends on a rear end portion of the main frame for lateral swinging movement about a vertical axis between alternate right- and left-hand plowing positions. An offset rear furrow wheel is carried by a mounting frame which is mounted on the rear end of a subframe for lateral swinging movement about a vertical axis between alternate right- and left-hand plowing positions. Linkage means are provided for swinging the mounting frame between its alternate plowing positions and to reverse the furrow wheel as the subframe is swung between its alternate plowing positions.

11 Claims, 6 Drawing Figures

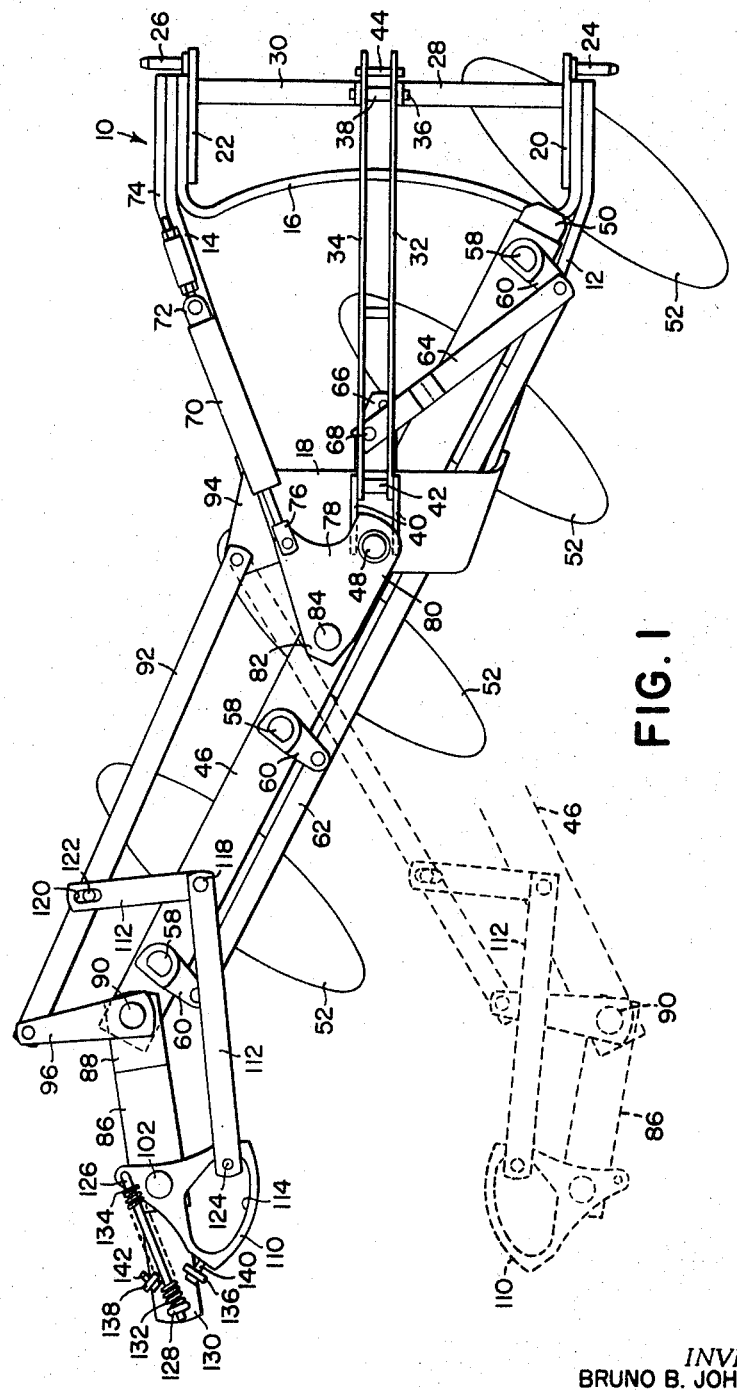

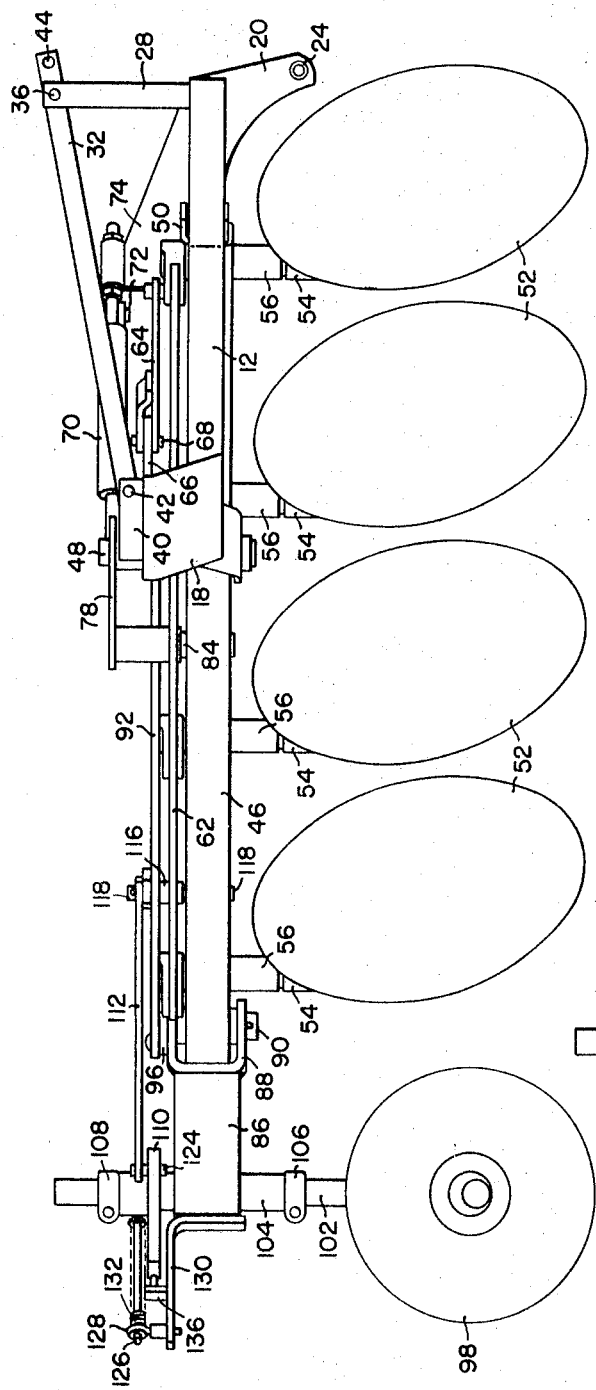

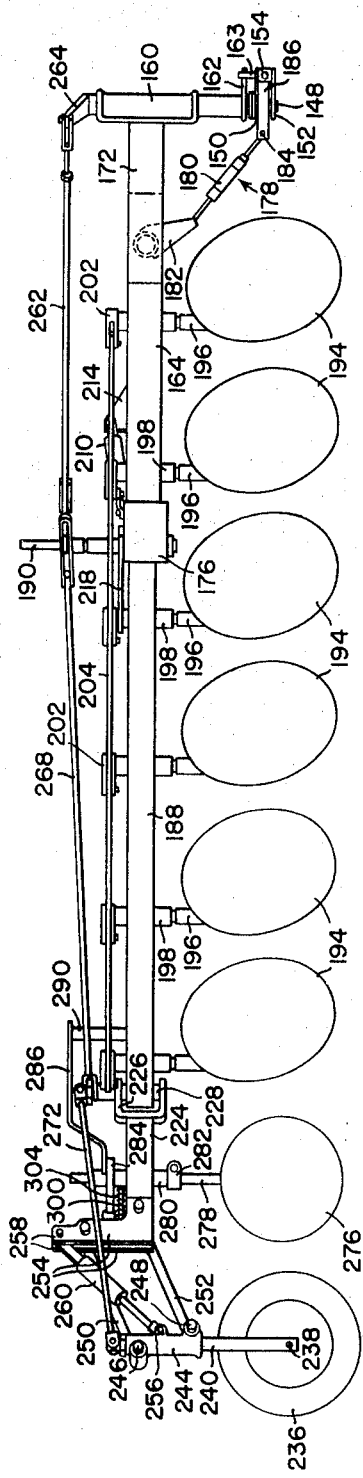
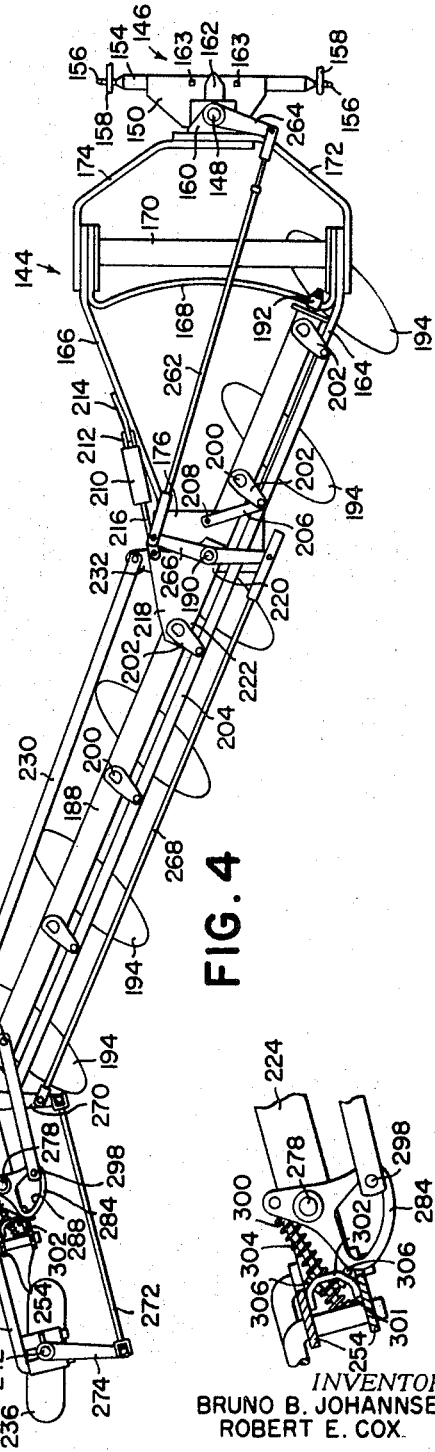
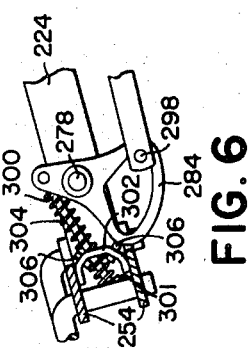
INVENTORS
BRUNO B. JOHANNSEN
ROBERT E. COX

REVERSIBLE DISK PLOW

BACKGROUND OF THE INVENTION

The present invention relates generally to agricultural implements and more particularly relates to reversible plows.

It is common practice to provide plows with a rear furrow wheel which will counteract the side thrust created by the soil acting against the plow bodies so that the plow travels in a substantially straight line. In order that the rear furrow wheel can withstand the side thrust generated by the plow bodies, it is usually carried on a stub axle which has its axis inclined at an angle to the horizontal so that the wheel is tilted from the vertical and the forces of the side thrust do not act parallel to its axis.

With a reversible disk plow, several problems are encountered in maintaining the rear furrow wheel in the proper position. As the disks are indexed for plowing in an opposite direction, the direction of the side thrust on the rear furrow wheel is reversed making it necessary to reverse the position or angle of tilt of the rear wheel furrow. Also, as the disks are indexed, the rearwardmost disks are swung to the opposite sides of the longitudinal center line of the plow. This makes it necessary to shift the rear furrow wheel laterally if it is to follow the the furrow formed by the rear disk.

SUMMARY OF THE INVENTION

An object of the present invention is to provide a reversible disk plow having an improved rear furrow wheel assembly which reverses the position of the rear furrow wheel and shifts the same laterally in response to movement of the disks between their alternate plowing positions.

A further object of the invention is to provide a rear furrow wheel assembly for reversible disk plowing in which the disks are carried by a subframe pivotally mounted intermediate its ends to the rear end of a main frame for lateral swinging movement between alternate right- and left-hand positions, an elongated mounting frame is pivotally mounted to the rear end of the subframe for lateral swinging movement in a direction opposite to the swinging movement of the subframe, the rear furrow wheel is carried by a generally vertical shaft rotatably mounted on the mounting frame, and linkage means is provided to rotate the shaft in response to swinging movement of the subframe to reverse the position of the rear furrow wheel.

Still another object of the invention is to provide a reversible disk plow having a reversible rear furrow wheel which is spring-biased to its alternate right- and left-hand positions from either side of a centered position and in which linkage means are provided to move the rear wheel from either its alternate positions to the opposite sides of the centered position.

Yet another object of the invention is to provide a reversible disk plow having a reversible furrow wheel and which means are provided to independently adjust the lead of the furrow wheel for alternate right- and left-hand positions.

An additional object of the invention is to provide a reversible rear furrow wheel assembly for a reversible disk plow which can be utilized on either a fully integral, or a semi-integral, reversible disk plow.

The above objects and additional objects and advantages will become apparent along with the details of construction of a preferred embodiment of the invention from a reading of the following detailed description when taken in conjunction with the accompanying drawings.

BRIEF DESCRIPTION OF THE DRAWINGS

In the drawings:

FIG. 1 is a top plan view of an integral reversible disk plow provided with a tail wheel assembly according to the present invention, the plow being shown in a right-hand plowing position in full lines and its left-hand plowing position in dotted lines;

FIG. 2 is a side elevational view of the plow illustrated in FIG. 1;

FIG. 3 is a rear elevational view of the rear furrow wheel in its right-hand plowing position;

FIG. 4 is a top plan view of a semi-integral reversible disk plow having a tail wheel assembly according to the present invention;

FIG. 5 is a side elevational view of the plow illustrated in FIG. 4; and

FIG. 6 is an enlarged view of a portion of the plow illustrated in FIG. 4.

DESCRIPTION OF THE PREFERRED EMBODIMENT

Referring now to FIGS. 1 – 3 of the drawings, a fully integral disk plow has a main frame indicated generally at 10 which includes right and left side frame members 12 and 14 which are bolted at their forward ends to a transversely extending brace and subframe supporting member 16. The right and left side frame members 12 and 14 are spaced equally to the sides of the longitudinal center line of the main frame 10 and their rear ends are secured to a box frame member 18 which is open at its forward and rear ends.

For the purpose of connecting the main frame to the conventional three-point hitch of a tractor, a pair of brackets 20 and 22 are bolted to the forward ends of the side frame members 12 and 14 and carry a pair of lower spaced hitch pins 24 and 26 respectively. A pair of hitch frame members 28 and 30 converge upwardly from the brackets 20 and 22 and have their upper ends connected to a pair of brace members 32 and 34 by a bolt 36. The bolt 36 extends through suitable apertures provided at the upper end of the hitch frame members 28 and 30 and near the forward ends of the braces 32 and 34. The braces 32 and 34 are maintained in spaced relationship at their forward ends by a spacer 38 mounted on the bolt 36. The braces 32 and 34 extend downwardly and rearwardly and have their rear ends connected to a pair of brackets 40 on the box frame member 18 by a pin 42. The forward ends of the braces 32 and 34 extend beyond the hitch frame members 28 and 30 and are provided with a pin 44 which forms the third point of connection with the tractor three-point hitch.

A subframe 46 is mounted on the main frame for swinging about a vertically extending axis between right- and left-hand plowing positions, FIG. 1 illustrating the frame in its right-hand plowing position in solid lines and in its left-hand plowing positions in dotted lines. An intermediate portion of the subframe is journaled about a pivot post 48 carried within the open box frame member 18. A forward portion of the subframe 46 is provided with a forwardly extending bracket 50 which slides along the subframe supporting member 16 when the subframe is swung between its right- and left-hand plowing positions.

A plurality of disk plow bodies 52 are mounted on the subframe and to this end, it should be noted that the disks 52 are carried by the lower end of standards 54, the upper end of the standards 54 being journaled for rotation within vertically extending sleeves 56 welded within the subframe 46. Each of the standards 54 is provided with a key-shaped upper end 58 to which an angling crank arm 60 is secured. The crank arms 60 are interconnected with each other by a rigid link 62 which extends parallel to the subframe 46. A further link 64 is interconnected between one of the crank arms 60 and a bracket 66 carried by the box frame member 18. The link 64 is connected to the bracket 66 by a pin 68 disposed on a longitudinal center line of the main frame. The link 64 causes the plow standards and disks to be properly angled as the subframe 46 is swung between its right- and left-hand plowing positions.

A double-acting extensible and retractable hydraulic cylinder 70 is provided to swing the subframe 46 between its right- and left-hand plowing positions. The anchor end 72 of the cylinder 70 is secured to an upstanding bracket 74 carried by the left side frame member 14, and the rod end 76 of the cylinder 70 is interconnected with a triangular angling bracket 78 having one apical portion 80 rotatably disposed about the pivot post 48 and another apical portion 82 rotatably mounted on an additional pivot post 84 carried by and extending upwardly from the subframe 46.

A wheel-mounting frame 86 is carried by the rear end of the subframe 46. To this end, the wheel-mounting frame 86 is provided with a C-shaped bracket member 88 which sandwiches the rear end of the subframe 46 and is mounted thereon by a pivot post 90 carried by the subframe 46. The wheel-mounting frame 86 is maintained at a diagonal with respect to the subframe 46, and as the subframe 46 is swung between its opposite diagonal positions with respect to the center line of the main frame for alternate right- and left-hand plowing, the wheel-mounting frame 86 is swung between opposite diagonal positions with respect to the frame 46. To this end, a four-bar linkage is provided which includes the rearward portion of the subframe 46 and a link 92 which is pivotally secured at its forward end to a bracket 94 carried to one side of the main frame 10 and at its rear end to an arm 96 carried by the wheel-mounting frame 86.

A rear furrow wheel 98 is mounted on the wheel-mounting frame 86 to counteract the side thrust created by soil acting against the disks 52. The furrow wheel 98 is rotatably mounted about a stub shaft 100 which has its axis inclined to the horizontal so that the furrow wheel 98 is tilted downwardly toward the unplowed land so that the forces created by the side thrust do not act parallel to the axis of rotation of the wheel 98. The stub shaft 100 is carried by the lower end of a vertical shaft 102 journaled in a sleeve 104 welded in the wheel-carrying frame 86. A pair of collar clamps 106 and 108 on the shaft 102 maintain the wheel 98 in proper vertical adjustment with the wheel-carrying frame 86 so that the disks 52 penetrate the earth to the precise desired depth.

When the subframe 46 is indexed for plowing in the opposite direction, the direction of the side thrust is reversed and it becomes necessary to reverse the position or angle of tilt of the rear furrow wheel 98. To accomplish this, a crank arm 110 is keyed to the upper end of the shaft 102 and is interconnected with a subframe and link 92 by an L-shaped crank arm 112. The link 110 is generally of triangular shape, is provided with a large opening 114 between two of its corners, and is mounted near its third corner on the shaft 102. The L-shaped crank arm 112 is fixed to a sleeve 116 rotatably mounted about a pivot post 118 carried by the subframe 46. The short leg of the L-shaped crank arm 112 is provided with an elongated slot 120 adjacent its outer end which receives a pin 122 carried by the link 92. The slot 120 and pin 122 provide a lost-motion connection between the link 92 and the short leg of the crank arm 112. The long leg of the L-shaped crank arm 112 is provided with a pin 124 near its outer end which extends through the opening 114 provided in the crank arm 110 to provide a lost-motion connection between the crank arm 110 and the long leg of the L-shaped crank arm 112.

It should be noted that as the subframe 46 is swung between its alternate plowing positions, the L-shaped crank arm 112 is only rotated through an arc of approximately 60° to 70°. However, in order to reverse the rear furrow wheel 98, it is necessary to rotate the shaft 102 through 180° or more. To accomplish this, a push rod 126 has one end hooked in a suitable aperture provided in the third corner of the triangular-shaped link 110 and its opposite ends slidably mounted in an eyebolt 128 rotatably mounted on a right-angle bracket 130 secured to the rear end of the wheel-mounting frame 86. A spring 132 is mounted on the rod 126 and acts between the eyebolt 128 and an abutment 134 on the rod 126 to normally urge the rod 126 forwardly. The rod 126 and spring 132 serve to rotate the shaft 102 to the degree required to reverse the rear furrow wheel 98. For example, as the subframe 46 is swung between its alternate positions, the L-shaped crank arm 112 will rotate the crank arm 110 about the axis of the shaft 102 from one of its extreme positions to an over-center position. During this original movement of the arm 110, the spring 132 is compressed. After the crank arm 110 has reached its over-center position, the spring 132 will urge the crank arm 110 beyond the over-center position to its opposite position. The large opening 114 provided in the triangular-shaped crank arm 110 permits the additional movement of the crank arm 110 since the pin 124 merely moves within the opening 114.

In order to limit the movement of the crank arm 110 and to determine the alternate positions of the rear furrow wheel 98, a pair of upstanding lugs 136 and 138 are provided on the bracket 130. The upstanding lugs 136 and 138 are provided with threaded apertures which receive bolts 140 and 142 respectively. The bolts 140 and 142 contact the sides of the triangular-shaped crank arm 110 when the furrow wheel 98 is in its alternate positions. Under normal plowing conditions, the rear furrow wheel 98 does not run precisely parallel to the direction of movement of the plow, but is positioned at a slight angle toward the plowed land. This small angle is referred to as the lead of the rear furrow wheel. The required lead may vary under various plowing conditions and to compensate for the various plowing conditions which may be encountered, the bolts 140 and 142 can be used to individually adjust the lead of the rear furrow wheel in its alternate plowing positions.

A second embodiment of the invention is illustrated in FIG. 4 and 5 and has the tail wheel assembly according to the present invention mounted on a semi-integral reversible disk plow. The plow illustrated in FIGS. 4 and 5 has a main frame indicated generally at 144 which is secured at its forward end to a mounting structure indicated generally at 146 for swinging or turning movement relative to the mounting structure about a vertically extending pivot post 148. The pivot post 148 is nonrotatably secured to the mounting structure 146, and to this end, it is rigidly secured to spaced apart upper and lower plates 150 and 152 respectively. Disposed between the forward ends of the plates 150 and 152 is a crossbar 154 having reduced end portions or hitch pins 156 which are connectible to the lower draft links 158 of a farm tractor having a conventional power-operated and vertically adjustable hitch. The main frame 144 of the plow is provided with a vertically extending sleeve 160 which is journaled for rotation about the pivot post 148. The lower forward end of the sleeve 160 is provided with a forwardly extending lug 162 which limits swinging movement of the main frame by contacting one of the stops 163 when the main frame has turned relative to the mounting structure to one of its extreme positions.

The main frame 144 includes right and left side frame members 164 and 166 which are bolted at their forward ends to a transversely extending subframe supporting member 168, a transverse extending brace 170, and right and left front members 172 and 174. The right and left front members 172 and 174 are bolted to each other and to the sleeve 160. The rear ends of the right and left side frame members 164 and 166 are secured to a box frame member 176 which is open at its front and rear ends.

A brace member 178 (not illustrated in FIG. 4) interconnects a lower portion of the pivot post 148 with the transverse brace 170 to prevent fore-and-aft shifting of the pivot post relative to the main frame 144. The brace 178 includes a turnbuckle assembly 180 which is secured at its upper end to a downwardly extending plate 182 carried by the brace 170. The lower forward end of the turnbuckle is secured by means of a pivot pin 184 to a sleeve member 186 disposed about the lower end of the pivot post 148.

A subframe 188 is mounted on the main frame for swinging about a generally vertically extending axis between right- and left-hand plowing positions. To this end, an intermediate portion of the subframe is journaled about a pivot post 190 carried by the open box member 176. A forward portion of the subframe 188 is provided with a forwardly extending roller 192 which rolls on the subframe supporting member 168 when the subframe is swung between its alternate right- and left-hand plowing positions.

A plurality of disk plow bodies 194 are mounted on the subframe and to this end it should be noted that the disks 194 are carried by the lower end of standards 196, the upper end of the standards 196 being journaled for rotation within vertically extending sleeves 198 welded within the subframe 188. Each of the standards are provided with a key-shaped upper end 200 to which an angling crank 202 is secured. The angling cranks 202 of the various standards are interconnected with each other by a rigid link 204 which extends parallel to the subframe 188. A further link 206 is interconnected with one of the angling cranks 202 and a pin 208 on the box member 176, the pin 208 being disposed on the fore-and-aft center line of the main frame. The link 206 causes the plow standards to be properly angled as the subframe is swung between the alternate right- and left-hand plowing positions.

A double-acting extensible and retractable hydraulic cylinder 210 is provided to swing the subframe 188 between its alternate right- and left-hand plowing positions. The anchor end 212 of the cylinder 210 is secured to an upstanding bracket 214 carried by the left side frame member 166, and the rod end 216 of the cylinder 210 is interconnected with a triangular angling bracket 218 having one apical portion 220 rotatably disposed about the pivot post 190 and another apical portion 222 rotatably mounted on the upper end of one of the standards 196.

An elongated wheel-mounting frame 224 is carried by the rear end of the subframe 188. To this end, the wheel-mounting frame 224 is provided with a C-shaped bracket member 226 on its forward end which sandwiches the rear end of the subframe 188 and is mounted thereon by a pivot post 228 carried by the subframe 188. The wheel-mounting frame 224 is maintained at a diagonal with respect to the subframe 188, and as the subframe 188 is swung between its opposite diagonal positions with respect to the center line of the main frame for alternate right- and left-hand plowing, the wheel-mounting frame 224 is swung between opposite diagonal positions in respect to the subframe 188. For the purpose of swinging the wheel-mounting frame 224 between its opposite diagonal positions as the subframe is swung between its opposite diagonal positions, a four bar linkage is provided which includes a rearward portion of the subframe 188 and a link 230 which is pivotally secured at its forward end to bracket 232 carried at one side of the main frame 144 and at its rear end to an arm 234 carried by the wheel-mounting frame 224.

A steerable rear transport wheel 236 is mounted on the rear end of the wheel-mounting frame 224 for both vertical movement relative to the frame 224 and also for turning movement about a generally vertical extending axis so that the rear end of the disk plow may be steered as the tractor turns relative to the main frame of the plow. The rear transport wheel 236 is mounted for rotation about a transversely extending axle 238 carried by the lower legs of a fork member 240. The upper end of the fork member 240 terminates in a shaft 242 journaled for rotation within a casting 244. The casting 244 is carried by the offset rear end portions 246 and 248 of upper and lower parallel arms 250 and 252. The forward ends of arms 250 and 252 are also offset and are journaled for rotation within a pair of brackets 254 secured to the rear end of the wheel-mounting frame 224. To raise and lower the rear end of the plow on the wheels 236, a bracket 256 is provided on the casting 244, the brackets 254 are provided with upper extensions 258 and an extensible and retractable hydraulic cylinder 260 is anchored between the bracket 256 and extensions 258. Extension of the cylinder 260 raises the rear portion of the plow on the wheel 236 while retraction of the cylinder permits downward movement of the rear end of the plow.

To steer the rear wheel 236 relative to the wheel-mounting frame 224 as the main frame 144 turns relative to the mounting frame 146, a steering linkage is provided which includes three steering links, two steering arms and two intermediate arms. The first steering link 262 is pivotally secured at its forward end to a first steering arm 264 carried by the pivot post 148 and is pivotally secured at its rear end to one end of a first intermediate link 266 which is journaled for rotation medially its ends about the upper end of the pivot post 190. The second steering link 268 has its forward end pivotally secured to the other end of the first intermediate link 266 and its rear end to a second intermediate link 270 journaled for rotation about the upper end of the pivot post 228. The third steering link 272 has its forward end pivotally secured to the second intermediate link 270 and its rear end pivotally secured to a second steering arm 274 fixed to the shaft 242. The steering linkage as above-described will turn the rear transport wheel 236 in a direction opposite to the turning movement of the tractor to reduce the overall turning radius of the plow.

A rear furrow wheel 276 is also mounted on the wheel-mounting frame 224 forwardly of the rear transport wheel. The furrow wheel 276 is identical to the furrow wheel 98 disclosed in the first embodiment of the invention illustrated in FIGS. 1 – 3 and is rotatably mounted about a stub shaft which has its axis inclined to the horizontal so that the furrow wheel 276 is tilted downwardly toward the unplowed land so that the forces created by the side thrust do not act parallel to the axis of the rotation of the furrow wheel. The stub shaft is carried at the lower end of a vertical shaft 278 journaled in a sleeve 280 welded to the wheel-carrying frame 224. The shaft 278 is maintained in proper vertical adjustment with the wheel-carrying frame 224 by suitable clamps 282 so that the disks 194 penetrate the earth at the precise desired depth.

When the subframe 188 is indexed for plowing in the opposite direction, the direction of the side thrusts on the rear furrow wheel is reversed and it becomes necessary to reverse the position or angle of tilt of the rear furrow wheel. To accomplish this, a crank arm 284 is keyed to the upper end of the shaft 278 and is interconnected with a subframe 188 and link 230 by an L-shaped crank arm 286. The link 284 is generally of triangular shape, is provided with a large opening 288 between two of its corners, and is mounted near the third corner on the shaft 278. The L-shaped crank arm 286 includes a sleeve 290 rotatably mounted about a pivot post 292 carried by the subframe 188. The short leg of the L-shaped crank arm 286 is provided with an elongated slot 294 adjacent its outer end which receives a pin 296 carried by the link 230. The slot 294 and pin 296 provide a lost-motion connection between the link 230 and the short leg of the crank arm 286. The long leg of the L-shaped crank arm 286 is provided with a pin 298 which extends through the opening 288 provided in the crank arm 284 and provides a lost-motion connection between the crank arm 284 and the long leg of the L-shaped crank arm 286.

Although the L-shaped crank arm 286 is rotated through an arc of approximately 60° to 70°, the shaft 278 is rotated through 180° or more to properly position the rear furrow wheel 236 in its alternate plowing positions by a push rod 300 which has one end hooked in a suitable aperture provided in the third corner of the triangular shaped link 284 and its opposite end slidably mounted in an eyebolt 301 mounted on the rear end of the wheel-mounting frame. A spring 304 is mounted on the rod 300 and acts between the eyebolt 301 and the forward end of the rod to normally urge the rod forwardly. The rod 300 and spring 304 serve to rotate the shaft 278 to the degree required to reverse the rear furrow wheel 276. For example, as the subframe 188 is swung between its alternate positions, the L-shaped crank arm 286 will rotate the crank arm 284 about the axis of the shaft 278 from one of its extreme positions to an over center position. During this original movement of the arm 284, the spring 304 is compressed. After the crank arm 284 has reached its over center position, the spring 304 will urge the crank arm 284 beyond the over center position to its opposite working position. The large opening 288 provided in the triangular-shaped crank arm 284 permits additional movement of the crank arm 284 since the pin 298 merely moves within the opening 288.

In order to limit the movement of the crank arm 284 and determine the alternate positions of the rear furrow wheel 276, a pair of set screws 306 are provided in opposite sides of a bracket 302 which is mounted between the brackets 254. The set screws 306 contact the sides of the triangular-shaped crank arm 284 when the furrow wheel 276 is in its alternate positions. By adjusting the set screws 306, the lead of the rear furrow wheel is varied to compensate for the various plowing conditions which may be encountered.

From the foregoing description, it can be seen that the present invention provides a rear furrow wheel assembly for either an integral or semi-integral reversible disk plow which is reversed each time the plow is indexed between its right- and left-hand plowing positions and in which the lead of the furrow wheel can be individually adjusted for each of its plowing positions.

While two preferred embodiments of the invention have been described and illustrated, various modifications within the scope of the invention will become apparent to those skilled in the art and can be made without departing from the underlying principles of the invention.

We claim:

1. A reversible disk plow including a main frame adapted to be connected to a propelling vehicle, an elongated tool-carrying subframe mounted intermediate its ends on a rear end portion of the main frame for lateral swinging about a generally vertical axis between opposite diagonal positions with respect to the longitudinal center line of the plow for alternate right- and left-hand plowing, an elongated wheel-mounting frame mounted on a rear end portion of the subframe for lateral swinging about a general vertical axis between opposite diagonal positions with respect to the subframe, indexing means responsive to movement of the subframe between its opposite diagonal positions to swing the wheel-mounting frame between its opposite diagonal positions, a rear furrow wheel carried by the wheel-mounting frame with its axis inclined with respect to the horizontal, means responsive to movement of the subframe between its opposite diagonal positions to reverse the rear furrow wheel, stop means provided on the wheel-mounting frame to determine the alternate plowing positions of the furrow wheel, the stop means being adjustable to provide for adjustment of either one or both of the alternate plowing positions of the rear furrow wheel.

2. The reversible disk plow set forth in claim 1 wherein the forward end of the main frame is mounted on a hitch frame for lateral swinging movement about a generally upright axis, a steerable rear transport wheel is movably mounted on the rear end of the wheel-mounting frame to raise and lower the rear end of the plow, and link means extend between the rear transport wheel and hitch frame to steer the rear transport wheel in response to swinging movement of the main frame relative to the hitch frame.

3. A reversible disk plow including a main frame adapted to be connected to a propelling vehicle, an elongated tool-carrying subframe mounted intermediate its ends on a rear end portion of the main frame for lateral swinging about a generally vertical axis between opposite diagonal positions with respect to the longitudinal center line of the plow for alternate right- and left-hand plowing, an elongated wheel-mounting frame mounted on a rear end portion of the subframe for lateral swinging about a generally vertical axis between opposite diagonal positions with respect to the subframe, indexing means responsive to movement of the subframe between its opposite diagonal positions to swing the wheel-mounting frame between its opposite diagonal positions, the indexing means including a pair of brackets mounted on the main frame and wheel-mounting frame and a rigid link having its opposite ends connected to the pair of brackets to form a four-bar linkage with the subframe, a generally vertical shaft journaled in and depending from the wheel-mounting frame, a rear furrow wheel carried at the lower end of the shaft with its axis inclined with respect to the horizontal, and means responsive to movement of the subframe between its opposite diagonal positions to reverse the rear furrow wheel by rotating the shaft, the last-mentioned means including a first crank arm fixed to the vertical shaft and a second crank arm mounted on the subframe for movement about a generally vertical axis, the second crank arm having its opposite ends operatively connected to the rigid link and the first crank arm.

4. The reversible disk plow set forth in claim 3 wherein the second crank arm has its opposite ends operatively connected to the rigid link and the first crank arm through lost-motion connections.

5. The reversible disk plow set forth in claim 4 wherein the first crank arm is fixed intermediate its ends to the shaft, spring means act on one end of the first crank arm to move the furrow wheel to its alternate positions from either side of a centered position, and the second crank arm acting on the opposite end of the first crank arm is operative to move the furrow wheel from either of its alternate positions to the opposite side of the centered position.

6. The reversible disk plow set forth in claim 5 wherein stop means are provided on the mounting frame and cooperate with the first crank arm to determine the alternate positions of the furrow wheel.

7. The reversible disk plow set forth in claim 6 wherein the stop means are independently adjustable whereby the lead of the furrow wheel in either of its alternate positions can be varied.

8. In a two-way plow including a main frame adapted to be connected to a propelling vehicle, a subframe pivotally mounted intermediate its end to a rear end portion of the main frame for lateral swinging movement between alternate plowing positions, a plurality of plow bodies carried by and depending from the subframe, an elongated wheel-mounting frame pivotally mounted on the rear end of the subframe for lateral swinging movement between opposite diagonal positions with respect to the subframe, linkage means acting between the main frame and wheel-mounting frame to swing the wheel-mounting frame between its opposite positions in response to swinging movement of the subframe between its alternate positions, and a rear furrow wheel assembly carried by and depending from the wheel-mounting frame, the improvement comprising: the rear furrow wheel assembly including a generally upright shaft journaled on and depending from the wheel-mounting frame, a rear furrow wheel rotatably carried at the lower end of the shaft with its axis inclined with respect to the horizontal, additional linkage means acting in response to swinging movement of the subframe between its alternate positions to reverse the rear furrow wheel, a pair of adjustable stop means carried by the wheel-mounting frame for alternate contact with the rear furrow wheel assembly to determine the alternate plowing positions of the furrow wheel.

9. The plow set forth in claim 8 wherein the additional linkage means is operative to move the rear furrow wheel from either of its alternate positions to an over center position in response to swinging movement of the subframe, and biasing means acting between the wheel-mounting frame and rear furrow wheel assembly continues the movement of the rear furrow wheel to its opposite positions.

10. The plow set forth in claim 9 wherein the rear furrow wheel assembly includes a crank arm keyed to the upright shaft, the additional linkage means includes a crank arm pivotally mounted intermediate its ends on the subframe, and the opposite ends of the last-mentioned crank arm are operatively connected to the first-mentioned crank arm and the first-mentioned linkage through lost-motion connections.

11. The plow set forth in claim 10 wherein the biasing means act against the first-mentioned crank arm.

* * * * *